(12) United States Patent
Chu

(10) Patent No.: US 6,854,360 B2
(45) Date of Patent: Feb. 15, 2005

(54) SOCKET TOOL FOR FORCIBLY DETACHING SCREW MEMBER AND A METHOD FOR MANUFACTURING THE SOCKET TOOL

(76) Inventor: Te Chen Chu, No. 369, Si Hu Road, Da Li, Taichung Hsien (TW), (412)

( * ) Notice: Subject to any disclaimer, the term of this patent is extended or adjusted under 35 U.S.C. 154(b) by 0 days.

(21) Appl. No.: 10/458,816

(22) Filed: Jun. 10, 2003

(65) Prior Publication Data

US 2004/0250657 A1 Dec. 16, 2004

(51) Int. Cl.[7] ............................................. B25B 13/50
(52) U.S. Cl. ........................................ 76/114; 81/53.2
(58) Field of Search .............................. 76/114, 101.1; 81/53.2, 121.1, 186

(56) References Cited

U.S. PATENT DOCUMENTS

| | | | | |
|---|---|---|---|---|
| 1,772,723 A | * | 8/1930 | Klein | 76/114 |
| 2,398,244 A | * | 4/1946 | Vaughan | 72/404 |
| 2,623,418 A | * | 12/1952 | Vaughan | 76/114 |
| 5,551,320 A | * | 9/1996 | Horobec et al. | 81/53.2 |
| 6,339,976 B1 | * | 1/2002 | Jordan | 81/53.2 |
| 2003/0056622 A1 | * | 3/2003 | Jordan | 81/53.2 |
| 2004/0079202 A1 | * | 4/2004 | Chrzanowski | 81/53.2 |

* cited by examiner

Primary Examiner—Douglas D Watts
(74) Attorney, Agent, or Firm—Charles E. Baxley

(57) ABSTRACT

A method for manufacturing a socket tool includes: forging a socket blank to form a plurality of arcuate locking grooves; hydraulic working to form a plurality of helical arcuate locking grooves in the socket blank; turning and cutting the periphery of the socket blank to make the periphery of the socket blank smooth; performing a heat treatment on the socket blank; and forming a socket tool having a plurality of helical arcuate locking grooves which are extended and contracted from an outer end to an inner end of the socket tool to form a contracted conical hole. Thus, the socket tool can be used to forcibly rotate and detach a hexagonal screw member having worn or rust corners.

2 Claims, 4 Drawing Sheets

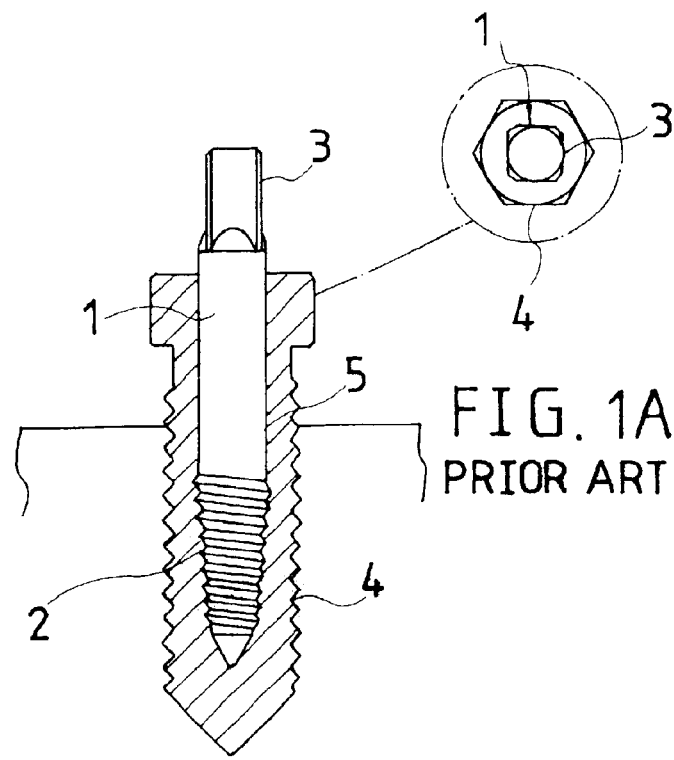
FIG. 1A
PRIOR ART
FIG. 1
PRIOR ART
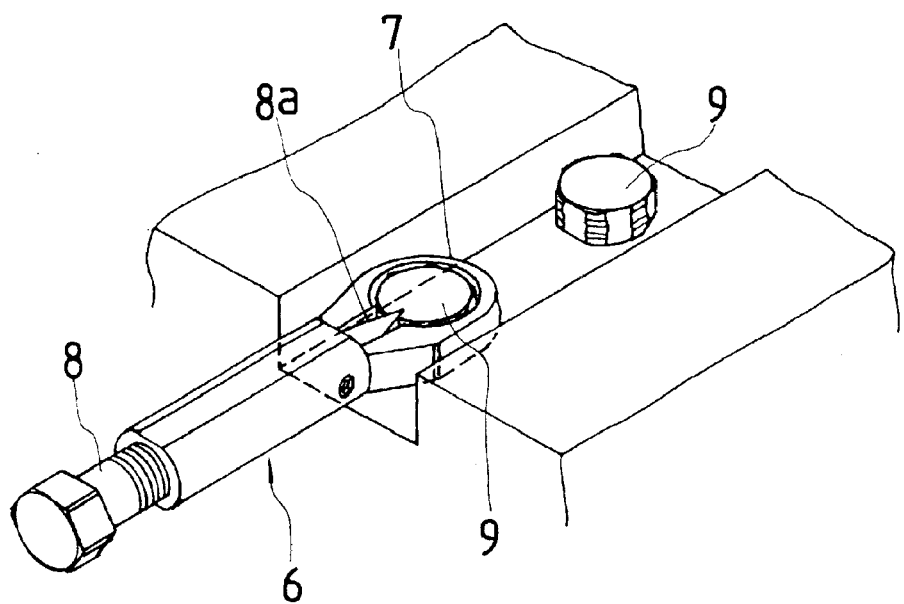
FIG. 2
PRIOR ART

SOCKET TOOL FOR FORCIBLY DETACHING SCREW MEMBER AND A METHOD FOR MANUFACTURING THE SOCKET TOOL

BACKGROUND OF THE INVENTION

1. Field of the Invention

The present invention relates to a socket tool for forcibly detaching a screw member and a method for manufacturing the socket tool, and more particularly to a socket tool for forcibly detaching a hexagonal screw member (such as the bolt or nut) having worn or rust corners.

2. Description of the Related Art

A first conventional forcible detachment tool 1 in accordance with the prior art shown in FIGS. 1 and 1A has a first end formed with an anti-reverse thread 2 and a second end formed with a square rod 3. Thus, when the hexagonal head of the bolt 4 is rust or worn out, the bolt 4 is drilled with a bore 5, so that the anti-reverse thread 2 of the forcible detachment tool 1 can be forced into the bore 5. Then, a driving tool (not shown) is mounted on the square rod 3 of the forcible detachment tool 1 to rotate the forcible detachment tool 1, so that the anti-reverse thread 2 of the forcible detachment tool 1 can force and rotate the bolt 4, thereby unscrewing the bolt 4 outward. However, the conventional forcible detachment tool 1 is not available for the nut. In addition, it is necessary to drill the bore 5 in the bolt 4 before use, thereby causing inconvenience to the user.

A second conventional forcible detachment tool 6 in accordance with the prior art shown in FIG. 2 comprises a locking rod 8, a mold block 8a, and a sleeve 7. In use, after the sleeve 7 is mounted on the hexagonal head 9 of a bolt (or nut), the mold block 8a at the front end of the locking rod 8 is adjusted penetrate into the hexagonal head 9. Then, the forcible detachment tool 6 is rotated so as to detach the bolt or nut. However, the forcible detachment tool 6 needs a larger operation space to detach the bolt or nut, so that the forcible detachment tool 6 cannot be operated in a smaller space.

SUMMARY OF THE INVENTION

The primary objective of the present invention is to provide a socket tool for forcibly detaching a screw member and a method for manufacturing the socket tool.

Another objective of the present invention is to provide a socket tool that can be used to forcibly rotate and detach a hexagonal screw member (such as the bolt or nut) having worn or rust corners.

A further objective of the present invention is to provide a socket tool that can reduce costs of fabrication and enhance efficiency of fabrication.

In accordance with a first feature of the present invention, there is provided a method for manufacturing a socket tool, comprising the steps of:

forging: forging and forming a socket blank which has a first end having an inner wall formed with a workpiece mounting recess having a plurality of axially arranged arcuate locking grooves, and a second end having an inner wall formed with a square mounting hole;

hydraulic working: placing the socket blank between an upper mold block and a lower mold seat of a hydraulic working machine, wherein the socket blank is positioned on the lower mold seat, the upper mold block has an end face rested on the workpiece mounting recess of the socket blank and has a periphery provided with a plurality of helical mold strips matingly contacting the arcuate locking grooves of the socket blank, the upper mold block is driven and rotated by a hydraulic force of the hydraulic working machine to move toward the socket blank, and to rotate the helical mold strips, so that the arcuate locking grooves of the socket blank are twisted by the helical mold strips to matingly form a plurality of helical arcuate locking grooves, the helical mold strips have a conical shape;

surface turning: turning and cutting the periphery of the socket blank to make the periphery of the socket blank smooth;

heat treatment: performing a heat treatment on the socket blank to enhance the stiffness and hardness of the socket blank; and forming a product: forming a socket tool which has an inner wall formed with a plurality of helical arcuate locking grooves arranged in an annular manner, wherein the helical arcuate locking grooves are extended and contracted from an outer end to an inner end of the socket tool to form a contracted conical hole.

In accordance with a second feature of the present invention, there is provided a socket tool, comprising:

an inner wall formed with a plurality of helical arcuate locking grooves arranged in an annular manner, wherein the helical arcuate locking grooves are extended and contracted from an outer end to an inner end of the socket tool to form a contracted conical hole, so that when the socket tool is mounted on a hexagonal screw member having worn or rust corners, the contracted conical hole is closely clamped on the outer peripheral face of the hexagonal screw member gradually by rotation of the socket tool, so as to unscrew and detach the hexagonal screw member.

Further benefits and advantages of the present invention will become apparent after a careful reading of the detailed description with appropriate reference to the accompanying drawings.

BRIEF DESCRIPTION OF THE DRAWINGS

FIG. 1 is a plan cross-sectional view of a first conventional forcible detachment tool in accordance with the prior art;

FIG. 1A is a top plan view of the first conventional forcible detachment tool as shown in FIG. 1;

FIG. 2 is a perspective view of a second conventional forcible detachment tool in accordance with the prior art;

DETAILED DESCRIPTION OF THE INVENTION

Figure 3:
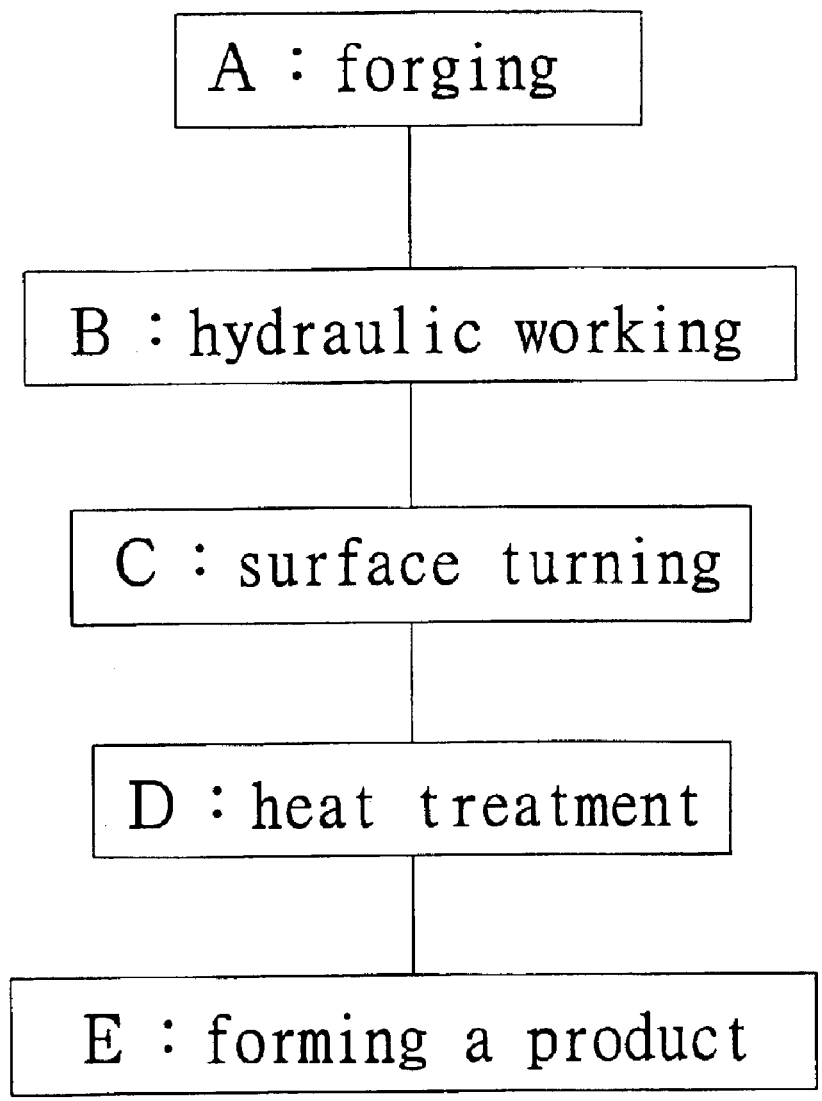
FIG. 3 is a flow chart of a method for manufacturing a socket tool in accordance with the preferred embodiment of the present invention.
Figure 7:
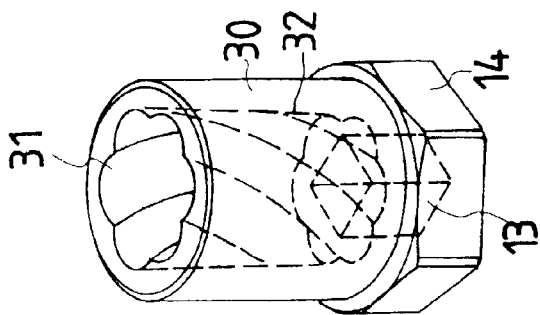
FIG. 7 is a perspective view of the socket tool in accordance with the preferred embodiment of the present invention.
Figure 6:
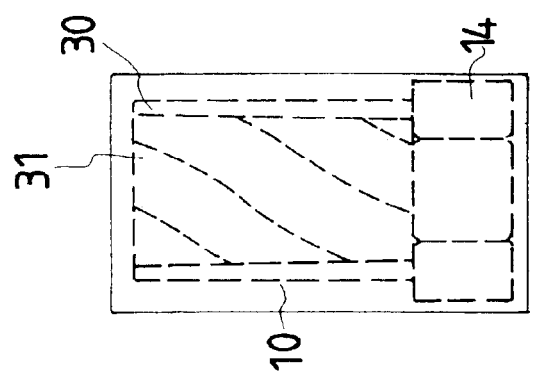
FIG. 6 is a plan view of a socket tool in accordance with the preferred embodiment of the present invention.
Figure 5:
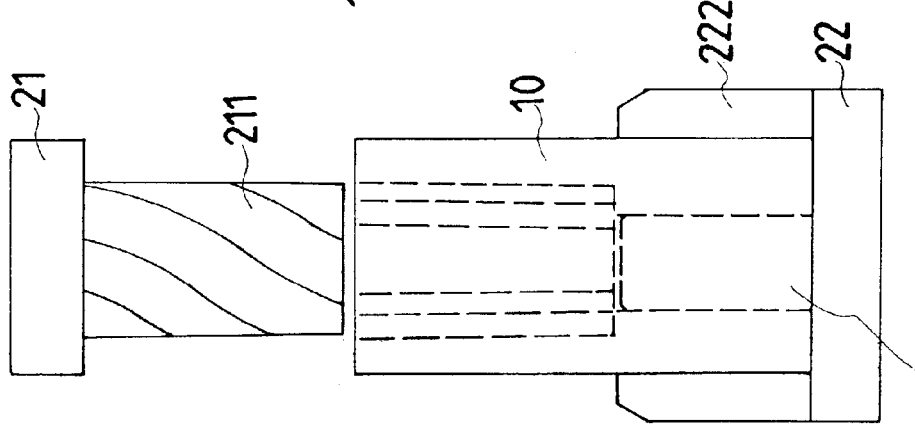
FIG. 5 is a plan view showing treatment of the socket blank by a hydraulic working process.
Figure 4:
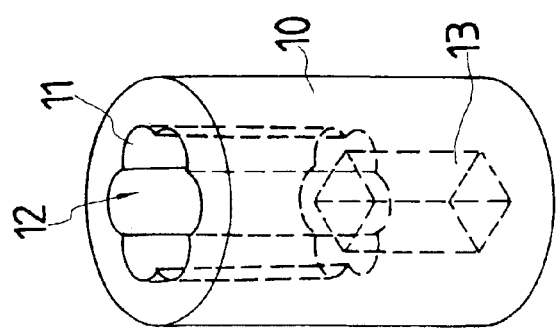
FIG. 4 is a perspective view of a socket blank in accordance with the preferred embodiment of the present invention.

Referring to the drawings and initially to FIGS. 3–7, a method for manufacturing a socket tool in accordance with the preferred embodiment of the present invention comprises the following steps:

(A) Forging: forging and forming a steel material into a socket blank 10 which has a first end having an inner wall formed with a workpiece mounting recess 12 having a plurality of axially arranged arcuate locking grooves 11, and a second end having an inner wall formed with a square mounting hole 13 for mounting a wrench tool (not shown);

(B) Hydraulic working: placing the socket blank 10 between an upper mold block 21 and a lower mold seat 22 of a hydraulic working machine (not shown), wherein the lower mold seat 22 includes a square post 221 inserted into the mounting hole 13 of the socket blank 10 and a clamping tool 222 clamped on the socket blank 10, the upper mold block 21 has an end face rested on the workpiece mounting recess 12 of the socket blank 10 and has a periphery provided with a plurality of helical mold strips 211 matingly contacting the arcuate locking grooves 11 of the socket blank 10, the upper mold block 21 is driven and rotated by a hydraulic force of the hydraulic working machine to move toward the socket blank 10, and to rotate the helical mold strips 211, so that the arcuate locking grooves 11 of the socket blank 10 are twisted by the helical mold strips 211 to matingly form a plurality of helical arcuate locking grooves 31, the periphery of the upper mold block 21 has a conical shape, thereby facilitating the upper mold block 21 detaching from the socket blank 10;

(C) Surface turning: turning and cutting the periphery of the socket blank 10 (the periphery of the socket blank 10 is distorted and deformed during the hydraulic working process) to make the periphery of the socket blank 10 smooth and to form a hexagonal mounting seat 14 on the periphery of the socket blank 10 for mounting an open-ended wrench (not shown);

(D) Heat treatment: performing a heat treatment on the socket blank 10 to enhance the stiffness and hardness of the socket blank 10; and (E) Forming a product: forming a socket tool 30 which has an inner wall formed with a plurality of helical arcuate locking grooves 31 arranged in an annular manner, wherein the helical arcuate locking grooves 31 are extended and contracted from an outer end to an inner end of the socket tool to form a contracted conical hole 32 so as to drive and rotate a hexagonal screw member (such as the bolt or nut) having worn or rust corners.

Figure 8:
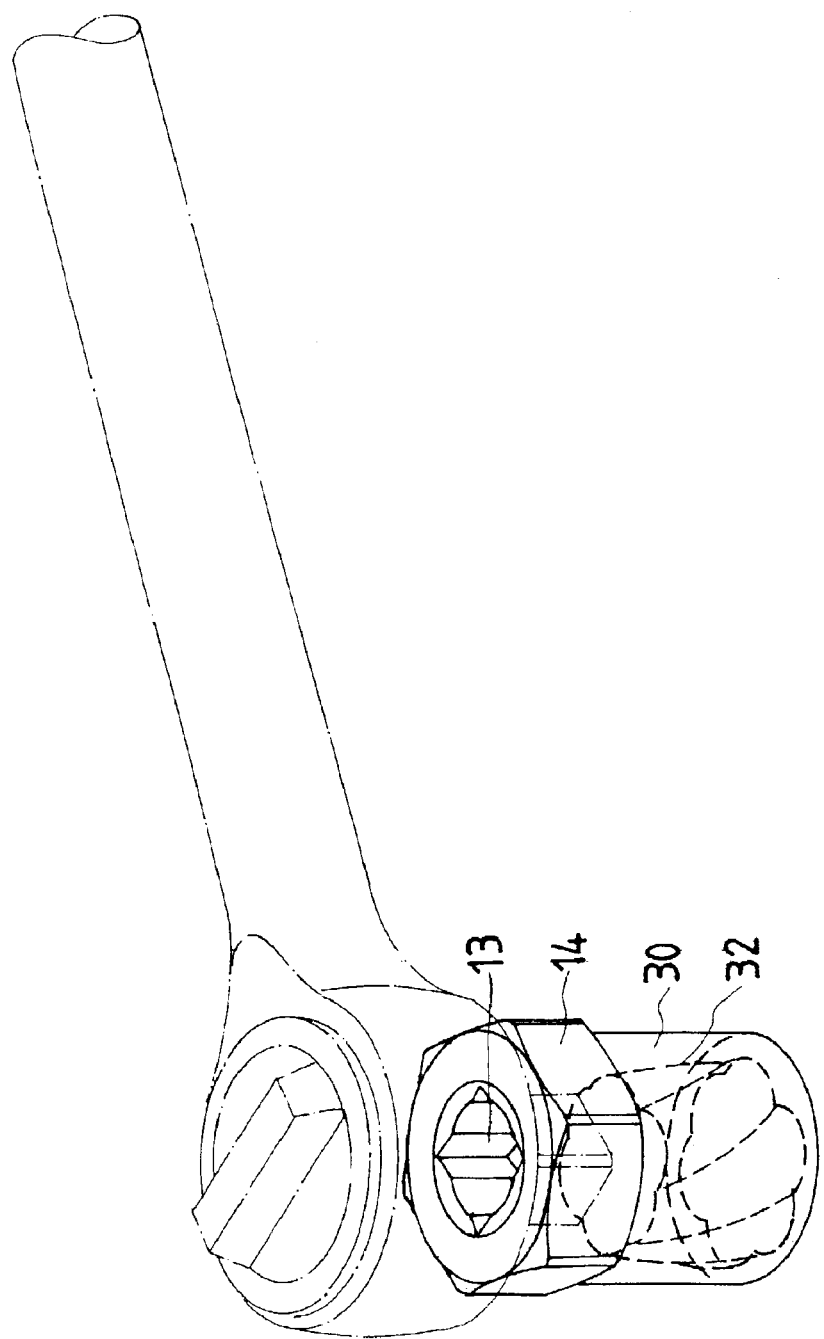
FIG. 8 is a schematic operational view of the socket tool as shown in FIG. 7 in use.

In operation, referring to FIG. 8, a socket wrench 40 has a square stud 42 inserted into the mounting hole 13 of the socket tool 30 to rotate the socket tool 30. In addition, the outer edges of the helical arcuate locking grooves 31 are contracted inward to form a contracted conical hole 32. Thus, when the socket tool 30 is mounted on a hexagonal screw member (such as the bolt or nut) having worn or rust corners, the contracted conical hole 32 is closely clamped on the outer peripheral face of the hexagonal screw member gradually by rotation of the socket tool 30, so as to unscrew and detach the hexagonal screw member.

Accordingly, the socket tool 30 of the present invention can largely reduce costs of fabrication and enhance efficiency of production. In addition, the socket tool 30 of the present invention has great strength and hardness.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. A method for manufacturing a socket tool, comprising the steps of:

forging: forging and forming a socket blank which has a first end having an inner wall formed with a workpiece mounting recess having a plurality of axially arranged arcuate locking grooves, and a second end having an inner wall formed with a square mounting hole;

hydraulic working: placing the socket blank between an upper mold block and a lower mold seat of a hydraulic working machine, wherein the socket blank is positioned on the lower mold seat, the upper mold block has an end face rested on the workpiece mounting recess of the socket blank and has a periphery provided with a plurality of helical mold strips matingly contacting the arcuate locking grooves of the socket blank, the upper mold block is driven and rotated by a hydraulic force of the hydraulic working machine to move toward the socket blank, and to rotate the helical mold strips, so that the arcuate locking grooves of the socket blank are twisted by the helical mold strips to matingly form a plurality of helical arcuate locking grooves, the helical mold strips have a conical shape;

surface turning: turning and cutting the periphery of the socket blank to make the periphery of the socket blank smooth;

heat treatment: performing a heat treatment on the socket blank to enhance the stiffness and hardness of the socket blank; and forming a product: forming a socket tool which has an inner wall formed with a plurality of helical arcuate locking grooves arranged in an annular manner, wherein the helical arcuate locking grooves are extended and contracted from an outer end to an inner end of the socket tool to form a contracted conical hole.

2. The method in accordance with claim 1, wherein the surface turning step further includes the step of:

forming a hexagonal mounting seat on the periphery of the socket blank for mounting an open-ended wrench.

\* \* \* \* \*